United States Patent
Patankar et al.

(10) Patent No.: US 10,049,397 B1
(45) Date of Patent: Aug. 14, 2018

(54) PROVIDING OPAQUE RECOMMENDATIONS

(71) Applicant: Amazon Technologies, Inc., Reno, NV (US)

(72) Inventors: Rashmi Arun Patankar, Kirkland, WA (US); Jeffrey Matthew Bilger, Seattle, WA (US); Colin Ian Bodell, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 444 days.

(21) Appl. No.: 13/787,035

(22) Filed: Mar. 6, 2013

(51) Int. Cl.
*G06Q 30/06* (2012.01)

(52) U.S. Cl.
CPC .............................. *G06Q 30/0631* (2013.01)

(58) Field of Classification Search
CPC .......................................... G06Q 30/00–30/08
See application file for complete search history.

(56) References Cited

U.S. PATENT DOCUMENTS

| | | | |
|---|---|---|---|
| 7,827,203 B2* | 11/2010 | Keil | G06F 17/50 707/796 |
| 2008/0313092 A1* | 12/2008 | Lanham | G06Q 30/08 705/80 |
| 2009/0089314 A1* | 4/2009 | Hicks | G06Q 30/0603 |
| 2011/0288910 A1* | 11/2011 | Garg | G06Q 30/0207 705/14.1 |
| 2013/0080427 A1* | 3/2013 | Cross | G06F 17/30648 707/728 |
| 2014/0058824 A1* | 2/2014 | Preciado | G06Q 30/0243 705/14.42 |

OTHER PUBLICATIONS

"Shopping for your self: When marketing becomes a social problem." Belair, Ann Renee. Concordia University (Canada), ProQuest Dissertations Publishing, 2003. MQ83840. Retrieved via ProQuest. (Year: 2003).*

* cited by examiner

*Primary Examiner* — Michael Misiaszek
(74) *Attorney, Agent, or Firm* — Athorus, PLLC

(57) ABSTRACT

Opaque offerings of items conceal at least one attribute of the items from customers, typically a brand associated with the items. Such offerings usually include a generic description of the items and an opaque price that is typically lower than a standard offered price for the items. By identifying customers who may have an interest in such items, and tailoring opaque recommendations of such items to such customers, an online marketplace may increase the likelihood that such items will sell to customers while protecting an owner of a brand of such items from any negative implication or connotation that may be associated with offering such items at substandard prices.

18 Claims, 8 Drawing Sheets

| Item Name | Item Stock Date | Item Specifications | Item Expiration Date | Notes | Opaque Lead Time | Eligible for Opaque Recommendation |
|---|---|---|---|---|---|---|
| Smartphone 1.0 | 06/01/2009 | Compatible with GSM, 3G, 802.11 WiFi, Bluetooth | 06/01/2010 | New Versions Released Annually | 60 days | 04/02/2010 |
| Copper River Salmon | 05/15/2010 | Frozen, 1 lb. cold water salmon filets | 06/15/2010 | Spoils in One Month | 5 days | 06/10/2010 |
| Cleaning Solution | 12/30/2009 | One gallon solution with proprietary solvent | 09/30/2010 | Solution 95% effective after nine months | 30 days | 08/31/2010 |
| Championship Tickets | 02/16/2011 | Four seats, front row, courtside | 03/12/2011 | Game Scheduled for March 12 | 4 days | 03/08/2011 |

FIG. 3

PROVIDING OPAQUE RECOMMENDATIONS

BACKGROUND

Online marketplaces are able to offer a variety of items (including goods, services, products, information or media of any type or form) to customers through one or more online portals, such web sites or other electronic interfaces, that may be accessible through the Internet. Such portals may provide customers with seemingly limitless amounts and types of information regarding the items that may be offered for sale, and customers may review such information when contemplating making one or more purchases. The prices at which such items are offered for sale at online marketplaces may generally be determined as a function of the available inventory of the items and the demand therefor.

Many items that are made available for purchase at an online marketplace are time bound, or time-sensitive in nature, such that the items have a date or time at which the values of the items will drop precipitously, or at which the items will otherwise expire or be rendered valueless. For example, where an online marketplace offers fresh groceries, non-refundable tickets to a one-time event, or a model of a home electronics component that is updated regularly for sale to customers, each of these items will experience a natural reduction in its intrinsic value due to natural circumstances (e.g., the spoiling of groceries or the completion of the one-time event) or market forces (e.g., the replacement of the model of the home electronics component with a newer model).

For some companies, particularly those associated with the sale of high-end, luxury retail items, the trademarks or brands that are affixed to or associated with such items may be their single largest source of intangible value. Thus, the owners of such trademarks or brands generally take great care to protect the value of their intellectual property, and to avoid actions that may otherwise reduce or hinder the strength of such trademarks or brands in the eyes of the market. For example, a manufacturer of a high quality line of audio equipment may elect to maintain the prices of such equipment at elevated levels, even when faced with accumulating levels of unsold inventory, rather than reduce the prices to reflect the market's demands for such items, as a price reduction may potentially imply that the equipment is worth less than the standard prices for which it is ordinarily offered. Likewise, a vendor of high-end perfumes may choose to destroy unsold amounts of a specific perfume, rather than offer and sell the perfume at reduced prices, which may be deemed an implicit admission that the perfume is overpriced, or of a cheap or inexpensive nature. In such situations, the direct loss of present revenue resulting from unsold items may be preferable to an indirect loss of future revenue incurred on account of damage to a brand associated with the items.

BRIEF DESCRIPTION OF THE DRAWINGS

FIG. 3 is a set of data to be analyzed or displayed by systems and methods for providing opaque recommendations, in accordance with embodiments of the present disclosure.

DETAILED DESCRIPTION

Figure 1:
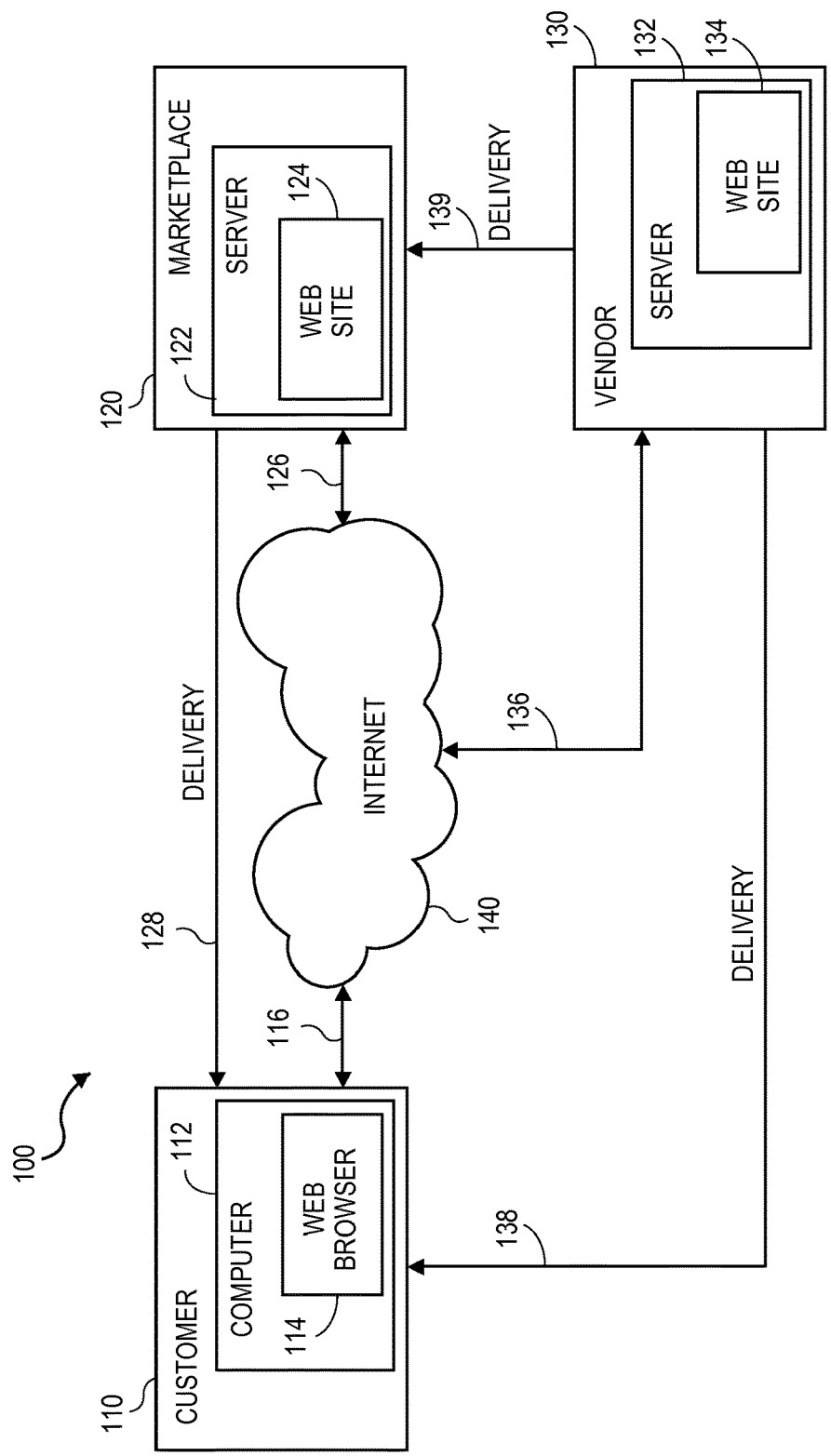
FIG. 1 is a block diagram of a networked system for providing opaque recommendations, in accordance with embodiments of the present disclosure.

As is set forth in greater detail below, the present disclosure is directed to systems and methods for providing opaque recommendations of items (including goods, services, products, information or media of any type or form) to customers. Specifically, the systems and methods disclosed herein are directed to identifying an item that is appropriate for recommendation to customers in an opaque manner, i.e., such that at least one element or characteristic of the item, or an offer for the item, is deliberately withheld from a customer to whom the item is recommended. Such systems and methods are further directed to identifying customers who would likely be receptive to an opaque offering of the item, and providing a personalized or tailored opaque recommendation of the item to such customers, usually at a discounted price that is below a standard offered price for the item. By presenting an opaque offering of an item in the form of a personalized recommendation, an online marketplace or other commercial entity may increase the likelihood that a customer will purchase the item at the discounted price while concealing one or more of the attributes of the item (e.g., a brand associated with the item) from the customer.

It is axiomatic that the sales of items at specific prices are governed by the laws of supply and demand. The law of supply generally holds that an available quantity of an item may vary directly based on its offered price, such that a number of units of an item that is offered for sale increases as a price of the item increases, and decreases as the price of the item decreases. The law of demand generally holds that purchasers of items will purchase more of an item at a lower price, and less of an item at a higher price. Where a price of an item is plotted with respect to both an offered supply of the item and an observed demand for the item on a common set of axes, the intersection of the plots is known as the "market price," or the "equilibrium price," for that item, such that the number of items supplied at the market price equals the number of items demanded at the market price. If the offered price of an item is below the market price or equilibrium price, an increased demand, and a shortage of supply (e.g., a deficit) for the item may be observed. Conversely, if the offered price of an item is above the market price or the equilibrium price, a shortage of demand, and an increased supply (e.g., a surplus) may be observed. Therefore, in order to address a surplus of an item, a merchant (e.g., a seller, a vendor or a manufacturer) of the item may reduce the offered price to more closely approach the equilibrium price.

The sales of some items are occasionally barred by real-world time constraints, which may cause demand for an item to wane or disperse at a given date or time. For example, where an item has a natural expiration date or time (e.g., a perishable food that may be expected to spoil) or where an item will be rendered obsolete or valueless at a known date or time (e.g., a ticket for a seat on a scheduled plane flight), the demand for that item may be reduced as the date or time approaches. Therefore, in order to increase the sales of an item in advance of the date or time at which the item will expire or otherwise lose its value, the offered price for the item may be reduced in order to remain consistent with the projected demand for the item. After an item has expired, or has otherwise lost its value, obtaining any form of return for the item is impossible.

Many owners of brands that are associated with items of high value or high prestige, however, are reluctant to significantly reduce the offered prices of items affiliated with the brand (e.g., a bottle of wine having a vintage label or a cabin on a cruise ship maintained by a luxury cruise line), for fear that such a price reduction may be interpreted by other participants in the market (e.g., customers or competitors) as a sign of weakness. Therefore, many such owners frequently maintain the prices of their items at standard, elevated levels, even when faced with an apparent or imminent devaluation of the items. For example, a high-end hotel operator may prefer to leave some of its rooms empty, and receive no revenue therefrom, rather than to offer vacant rooms at market prices which may be less than a price level at which the operator would prefer that customers associate with its hotel.

As opposed to a transparent offering, in which a customer is fully aware of each of the details regarding an item to be downloaded, purchased, rented, leased, borrowed or otherwise acquired, an opaque offering is an offering of an item in which at least one of the details of the item is concealed from the customer until after the customer has completed a transaction for the item (e.g., executed an agreement to download, purchase, rent, lease, borrow or otherwise acquire the item), and such transactions are typically final upon their execution. Opaque offerings are particularly valuable where a customer requires an item with one or more specific attributes, features or capacities (e.g., the rental of an automobile for temporary travel, or the purchase of a backpack that can accommodate a laptop computer), but is less concerned with whether the item includes any other, less essential features or attributes. For example, some customers who are interested in renting an automobile for temporary travel may require a car having little more than one seat and four wheels, while other customers who are interested in purchasing a backpack to accommodate a laptop computer may simply need a zippered case having one or more straps that can fit a laptop's dimensions.

Therefore, any items that share the mandatory essential attributes, features or capacities (e.g., all available automobiles of any size or type that have been designated for renting to customers, or all backpacks having sufficiently large zippered cases with straps) may be pooled together and marketed to the customer as sharing the essential attribute in opaque offerings, which need only describe such attributes, features or capacities, and may omit other, less essential details. In such a manner, it has been shown that in fields where brand loyalties are predominant, opaque offerings that withhold such brand names of items may result in increased industry profits.

For example, where a customer who is traveling to Connecticut for a weekend is interested in renting a hotel room, a transparent offering would identify each of the details associated with a specific hotel, such as attributes of the available room (e.g., bed sizes or views), a street address of the hotel, any preferred means for accessing the hotel via transit, and the like, and would include a standard price for the hotel. In contrast, where a customer requests an opaque offering for such a hotel room, the available rooms that qualify for such an offering may be grouped and described in vague or general terms, such as "hotel rooms in central Connecticut," "downtown Hartford lodging," or the like. Thus, because an opaque offering of an item typically includes only generalities regarding the item, a customer must decide on the surface whether he or she is interested in purchasing the item, and usually does not learn of the exact, specific details regarding the item (e.g., the name of the hotel) until after a transaction for the item has been completed. Reflecting this uncertainty or lack of transparency, items that are presented to customers in opaque offerings are typically offered at prices that reflect a marked discount below a standard offered price for the item.

Opaque offerings may be used by owners of brands to increase sales volumes while protecting themselves against any potential negative perception that may be associated with an offering of an item at a reduced price. Such owners may permit one or more of their items to be reclassified by another entity (e.g., an intermediary such as an online marketplace) and marketed to customers in an opaque offering that conceals at least one detail of the item, such as the brand of the item, but includes an offer for the item for sale or rental to customers at reduced prices. When items are presented in the form of opaque offerings, an owner of the brand of the item is more likely to sell or rent the available item to customers, based on the laws of supply and demand, but is also able to protect itself from any negative inference that may be associated with the actual lower-priced offering, since a customer will not learn of the brand of the item included in the opaque offering until after the transaction has been executed.

Opaque offerings may provide a number of advantages to retailers or service providers, or electronic marketplace at which such offerings are made. First, where an item is set to expire or experience a reduction in value or market price, the item may be advertised to customers in the form of an opaque offering, in a manner that conceals the names of one or more brands associated with the item, but also increases the likelihood of sales of the item. If the aggregate revenue received from the sales of items through opaque offerings exceeds the aggregate revenue of the sales of the item through transparent offerings, then the brand owner benefits from the increased revenue but without suffering any express or implicit repercussions based on the reduced price offering.

For example, where an original model of a mobile telephone is about to be rendered obsolete, or below the state of the art, by another model of the same mobile telephone that is soon to be released, an electronic marketplace may pool mobile telephones of the original model together with other models of mobile telephones, and offer such telephones at a discounted price under a general heading of "cell phones" or "smart phones," without affiliating the manufacturer of the mobile telephone with the reduced-price offering. Therefore, the public is likely to associate discounted offerings of mobile phones with the electronic marketplace, and is unlikely to associate the discounted offering of the original model of the mobile telephone with the manufacturer. Second, by providing an opaque offering that conceals a brand name of an item, an online marketplace may expose customers to brands of items in which they may not have previously had any interest without the discount. For example, if a customer is interested in a type of product but is unwilling to purchase the product at its standard price, the customer may be able to afford the product at a reduced price in an opaque offering.

Moreover, providing an opaque offering of an item that conceals the brand associated with the item may further protect the owner of the brand from lost revenues. For example, if the owner of a brand chooses to reduce the prices of transparent offerings of items on its own accord, customers may become trained to expect reduced prices from the brand owner. Thus, by reducing the prices, the brand owner may inadvertently initiate a cycle of price degradation, whereby customers learn to wait to purchase items associated with the brand until the prices of such items have decreased. Conversely, where an item is made available at a reduced price through an opaque offering, customers may be unable to predict when, or how frequently, prices of items under a particular brand may be reduced.

An item that is suitable for an opaque offering may be identified on any basis. One category of items that is generally appropriate for presentation to customers in opaque offerings includes items of a time-sensitive nature, or items for which a substantial drop in value or market price may be expected to occur at a predetermined time in the future. For example, foods such as meats, produce and dairy products have a natural spoiling or expiration date or time at which such foods will no longer be saleable to customers. Similarly, a ticket to travel on a specific train, or a license to rent a hotel room for a designated evening, which are certain to be rendered valueless either after the show is complete, after the train departs, or on the following morning, respectively, also have a date or time at which they may provide no value.

Further, other items that may be appropriate for presentation to customers in an opaque offering include those items having high inventory levels (e.g., items that have remained unsold for an extended period of time at their current prices), or items that have been sold to customers and then returned as unwanted. As is discussed above, surpluses of items indicate that an offered price for the items is above the equilibrium price. If an owner of a brand associated with such items is unwilling to reduce the price of such items, the items may be presented to customers in an opaque offering.

Finally, an item may be designated as appropriate for inclusion in an opaque offering as a part of a campaign or other form of concerted effort to introduce the item to customers. For example, where a merchant intends to offer a new product for sale within an established marketplace under a little-known brand, the merchant may identify the new product as suitable for inclusion in opaque offerings to customers by a marketplace. Then, the marketplace may identify one or more customers who may be interested in purchasing the product, and present an opaque recommendation of the product to such customers. In this manner, the product may be made available to customers who are interested in the product but may be unfamiliar with the brand.

Items may also be identified as suitable for opaque offerings with respect to a particular schedule or timeframe. Where an item is known or determined to have a certain expiration or spoiling date, the item may be made eligible for inclusion in an opaque offering or recommendation within a designated lead time in advance of the expiration or spoiling date. For example, where a ticket to a sporting event that is to be held at 7 o'clock p.m. on October 19, the ticket may be made eligible for inclusion in an opaque recommendation on a predetermined number of days in advance of October 19, or a predetermined number of hours in advance of 7 o'clock, to increase the likelihood that the ticket will be sold through the opaque recommendation before the game begins. Likewise, where a certain type of chocolate candy is known to expire four weeks after the candy has been molded, the candy may be deemed eligible for inclusion in an opaque recommendation during a lead time (e.g., one week) before the expiration date.

Where an item has been identified as suitable or appropriate for inclusion in an opaque offering, the systems and methods disclosed herein may further identify customers who may be interested in such items, based on one or more aspects of the customers' shopping interests or behavior, and may generate personalized or tailored opaque recommendations of such items for each individual customer, or for the customers as a group. By identifying select customers who are likely to be interested in opaque offerings of such items, and by providing specifically personalized or tailored opaque recommendations of such items to such select customers, an online marketplace may increase the likelihood of obtaining a return on an item before the item drops in value, or to increase the current return on the item, while shielding the owner of the brand from any negative impact or effect to the brand that may be associated with the offering of the item at the discounted price.

For example, a customer who has established a level of trust or confidence in recommendations provided by an online marketplace is more likely to purchase an item through an opaque recommendation made by the online marketplace based on that level of trust or confidence. Therefore, a conversion rate for sales of the item through an opaque recommendation made by the online marketplace may be expected to exceed a conversion rate for sales of the item through an opaque offering of the item made by the source of the item (e.g., a merchant, such as a seller, a vendor or a manufacturer). Moreover, a price of an item that is presented in an opaque recommendation from the online marketplace (i.e., an "opaque price") may exceed an opaque price of the item presented in an opaque offering of the item made by the source of the item, for at least the same reasons. Finally, where an opaque recommendation is made by the online marketplace, and not by a source of the item, the source of the item may avoid any negative implications or damages to the brand that may be associated with offering the item at a substandard price.

Customers who may be interested in receiving opaque recommendations of items may also be identified on any basis, such as one or more factors indicative or representative of the customer's shopping behavior. For example, where a customer has previously purchased an item, other items that are similar to the item purchased by the customer may be presented to the customer in the form of an opaque recommendation. Likewise, where a customer has previously purchased an item, and other customers who purchased the same item also purchased an item that is eligible for an opaque offering, that item which was also purchased by such other customers may be recommended to the customer in the form of an opaque recommendation. Furthermore, customers may be identified as potentially interested in receiving opaque recommendations of items based on their interest in one or more intrinsic aspects of an opaque offering, such as the purchase of items at a discounted price, or the mystery or intrigue associated with not learning one or more attributes of an item (e.g., a brand of the item) until after a transaction for the purchase of the item has been executed.

According to one embodiment of the present disclosure, the similarity of the items that are suitable for opaque offerings may be determined with respect to one or more of the other items in a product catalog or registry. For example, pairwise similarity scores may be calculated between and among the items in a product catalog, either in real time or in near-real time processes, or in offline processes, and stored in a data store, such that a quantitative or qualitative indicator of the similarity between each item in the product catalog and each of the other items may be obtained. If a customer is interested in one or more items that have sufficiently high similarity scores with respect to items that are eligible for an opaque offering, an opaque recommendation of at least one such item may be provided to the customer at an appropriate time. Additionally, any other algorithms, formulas or equations for determining the similarities or associations between items that are eligible for inclusion in an opaque recommendation and the items in which such users are interested, such as one or more matrix factorization models or artificial neural networks, may be utilized to identify an appropriate item that is eligible for an opaque offering for any given customer. Moreover, the eligibility of an item for inclusion in an opaque recommendation may be determined with regard to one or more thresholds, such that only items having a similarity score or other qualitative or quantitative metric above a certain threshold with respect to one or more items in which the customer is believed to have an interest may be presented to the customer in the form of an opaque recommendation.

Once an item that is eligible for an opaque offering and a customer who is interested in such an item are identified, an opaque recommendation of the item may be presented to the customer in any format, which may be requested or specified by the customer. According to one embodiment of the present disclosure, an opaque recommendation of an item may be provided to a customer on one or more user interfaces, which may present some, but not all, of the details of the item to the customer, preferably in an interactive format. For example, a customer who is searching for one or more items at an online marketplace may be presented with an opaque recommendation in a dedicated window, or with or among transparent offerings or other opaque recommendations may be displayed on the same window. According to another embodiment of the present disclosure, an opaque recommendation of an item may be forwarded to a customer in an electronic message (e.g., an electronic mail message, a text message, a social network posting or other form of message), which may include one or more links to details regarding an opaque offering of the item, or features for purchasing the item. Opaque recommendations may also be presented to customers randomly, or on a predetermined schedule, or within one or more distinct contexts (e.g., a specific or applicable time of day or year).

The contents of an opaque offering may be determined on any basis. According to one embodiment of the present disclosure, where an online marketplace is in possession of a variety of details regarding an item, which may be displayed in one or more transparent offerings to customers, the number or specificity of such details may be reduced or diluted for inclusion in an opaque offering by manual or automatic means. For example, a product details page for an item may be processed using one or more sentiment extraction and analysis models to identify the core, essential details of the item, and one or more of such details may be provided in an opaque recommendation of the item to a customer, with varying levels of opacity. Thus, a product details page for a five-pound wheel of a specific brand of farm-style cheddar cheese from the Saxon Homestead Creamery of Cleveland, Wis., may be analyzed to generate an opaque offering of "American cheddar cheese," "5-lb. Wisconsin cheese," or "block of farm-style cheddar cheese." The merchant or marketplace that offers such an item may customize the levels of opacity of information regarding the item that is provided to the customer in an opaque recommendation, and the purchase price may be a function of the level of opacity provided to the customer.

Additionally, a customer who requests an opaque recommendation, or otherwise expresses an interest in receiving recommendations of items in an opaque manner, may provide at least one of the systems and methods of the present disclosure with filter inputs which may be used to reduce or refine the scope of items that may be presented to the customer in the form of an opaque recommendation. For example, a customer may define the types or categories of items for which he or she is interested in receiving an opaque recommendation, as well as a range of opaque prices for which he or she would be willing to pay in response to an opaque recommendation. Such inputs may be provided through one or more user interfaces at the time that a request for an opaque recommendation is made, or otherwise established by the user in settings maintained in a customer profile or other record.

The price of an item included in an opaque recommendation (e.g., an opaque price) may be determined on any basis, as well. As is discussed above, prices of items included in opaque offerings are typically substantially below the standard offered prices for the same items in transparent offerings. Thus, opaque prices of such items may be determined as a function of a desired return on sales of the items, a desired rate at which the items are to be sold, a date of an upcoming expiration or devaluation of the items, or any other factor. For example, an opaque price of an item may be determined as a function of the time remaining until an expiration date associated with the item. Additionally, the opaque price may also be determined based on a strength of a recommendation of the item, or an association of the item with the customer, as necessary.

Those of ordinary skill in the art will recognize that one or more of the embodiments disclosed herein may be utilized in combination (i.e., in series or in parallel) with one another, and that none one of the embodiments disclosed herein is exclusive. For example, opaque recommendations of items may be presented to customers who already have access to transparent offerings of the same items. Moreover, those of ordinary skill in the art will also recognize that opaque recommendations of items provided to customers in accordance with the present disclosure are not limited to items that are perishable or otherwise slated for expiration.

Referring to FIG. 1, the various components of one embodiment of a method and system for providing opaque recommendations in accordance with embodiments of the present disclosure, are shown. The system 100 includes a customer 110 (or user, consumer, client, shopper or buyer), an online marketplace 120 (or supplier, retailer, seller, reseller or distributor) and a vendor 130 connected to one another over a network 140, such as the Internet.

The customer 110 may be any entity or individual that wishes to download, purchase, rent, lease, borrow or otherwise obtain items (which may include goods, products, services or information of any type or form) from the marketplace 120. The customer 110 may utilize one or more computing devices, such as a computer 112, or any other like machine that may operate or access one or more software applications, such as a web browser 114. The computer 112 or the other like machines utilized by the customer 110 may be connected to or otherwise communicate with marketplace 120 or the vendor 130 through a communications network 140, such as the Internet, as indicated by line 116, by sending and receiving digital data over the network 140.

The marketplace 120 may be any entity that sells or otherwise makes items available for download, purchase, rent, lease or borrowing by customers, such as the customer 110. Additionally, the marketplace 120 itself may also be a manufacturer or vendor, such as the vendor 130.

The marketplace 120 may include or operate one or more physical computer servers 122, and maintain a marketplace web site 124 which may be implemented using one or more of the servers 122. Additionally, the marketplace 120 may feature software applications and/or hardware components for analyzing data received from customers, such as customer 110, or from vendors or manufacturers, such as the vendor 130, including data regarding items in which customers may have an interest. The marketplace 120 and/or the servers 122 may be connected to or otherwise communicate with the customer 110 or the vendor 130, as indicated by line 125, by sending and receiving digital data over the network 140. As is shown in FIG. 1, the marketplace 120 may receive items from vendors or manufacturers, such as the vendor 130, as is indicated by line 139, and may deliver items to customers, such as the customer 110, as is indicated by line 128.

The vendor 130 may be any individual or entity that manufactures or sells items (including goods, products, services or information of any type or form) to be made available at the marketplace 120 to customers, including but not limited to customer 110. The vendor 130 may utilize one or more computing devices, such as a vendor server 132, or any other like machine which may operate or access one or more applications or services, such as a vendor web site 134. The vendor server 132 may be connected to or otherwise communicate with the customer 110 or the marketplace 120 through the network 140, as indicated by line 136, by sending and receiving digital data over the network 140. The vendor 130 may deliver items to one or more customers, such as the customer 110, as is indicated by line 138, or to one or more online marketplaces, such as the online marketplace 120, as is indicated by line 139.

The web browser 114 operating on the computer 112 may provide one or more features or user interfaces that permit the customer 110 to view and access online content, such as the content provided at one or more web sites, including but not limited to the marketplace web site 124 or the vendor web site 134. Also, those of skill in the pertinent art will recognize that the customer 110, the marketplace 130 and the vendor 130 may use a keyboard, keypad, mouse, stylus, touch screen, or other device (not shown) or method for interacting with the computer 112, the web browser 114, the server 122, the web site 124, the server 132 and/or the web site 134, or to "select" an item, link, node, hub or any other aspect of the present disclosure.

The computers, servers, devices and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein.

Except where otherwise explicitly or implicitly indicated herein, the terms "user," "customer," "consumer," or like terms, may refer to any entity or individual that wishes to download, purchase, rent, lease, borrow, or otherwise obtain items or media from a marketplace and/or a media service, as well as the associated computer systems operated or controlled by a customer, a consumer or a user, respectively.

Except where otherwise explicitly or implicitly indicated herein, the term "marketplace," or like terms, may refer to any entity or individual that sells or otherwise makes items available for download, purchase, rent, lease or borrowing using one or more computer systems, as well as the associated computer systems operated or controlled by such an entity or individual. Except where otherwise explicitly or implicitly indicated herein, the term "vendor," or like terms, may refer to any entity or individual that manufacturers or sells items to be made available for download, purchase, rent, lease or borrowing by customers from an online marketplace.

Thus, process steps described as being performed by a "user," a "customer" or a "consumer," a "marketplace" or a "vendor" may be automated steps performed by their respective computer systems or devices, or implemented within software modules (or computer programs) executed by one or more computer systems or devices. Specially designed hardware could, alternatively, be used to perform certain operations.

The customer 110 may use any software, web-enabled or Internet applications operating on a computing device 112, such as the web browser 114 or any other client-server applications or features including electronic mail (or E-mail), short or multimedia messaging service (SMS or MMS) text messages, social network messages or postings, or other messaging techniques to communicate with (or connect to) the marketplace 120, the vendor 130, the servers 122, 132 and/or the web sites 124, 134, through the communications network 140. In addition, the computing devices utilized by users in accordance with the present disclosure may be any of a number of computer-related machines that are capable of communicating over the network 140, including but not limited to set-top boxes, personal digital assistants, mobile telephones, digital media players, web pads, desktop computers, laptop computers, tablet computers, smart phones, televisions, automobile entertainment systems, appliances, electronic book readers, and the like. The protocols and components for providing communication between the computing device 112 and/or the web browser 114, the marketplace server 122 and/or web site 124 and/or the vendor server 132 and/or web site 134 are well known to those skilled in the art of computer communications and thus, need not be described in more detail herein.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The data and/or computer-executable instructions, programs, firmware, software and the like (also referred to herein as "computer-executable" components) described herein may be stored on a computer-readable medium that is within or accessible by the computer 112, the marketplace servers 122 and/or the vendor servers 132, and having sequences of instructions which, when executed by a processor (such as a central processing unit, or CPU), cause the processor to perform all or a portion of the functions and/or methods described herein. Such computer-executable instructions, programs, software and the like may be loaded into the memory of the computer 112, the manufacturer server 122, the vendor server 132 using a drive mechanism associated with the computer-readable medium, such as a floppy drive, CD-ROM drive, DVD-ROM drive, network interface, or the like, or via external connections.

The machine-readable storage medium may include, but is not limited to, hard drives, floppy diskettes, optical disks, CD-ROMs, DVDs, read-only memories (ROMs), random access memories (RAMs), erasable programmable read only memories (EPROMs), electrically erasable programmable read only memories (EEPROMs), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As is discussed above, the systems and methods of the present disclosure are directed to identifying items that are suitable for inclusion in an opaque offering, to identifying customers who may be interested in purchasing such items in response to an opaque offering, and to providing such customers with an opaque recommendation of one or more of such items. The suitable items may be identified by any means or on any basis, such as a time or date on which the items will experience a reduction in value, or a duration of which the items have remained unsold at their offered prices. The customers who may be interested in receiving opaque offerings of such items may also be identified by any means or on any basis, such as the customers' shopping histories or behaviors, or the shopping histories or behaviors of other customers who may be deemed to have interests that are similar to those of the customer. Moreover, an opaque recommendation of an item may take any form, such as one or more user interfaces displaying details regarding the item and/or features for selecting the item, or an electronic message that includes such details and/or features. For the purposes of illustration, some of the systems and methods disclosed herein may be referenced primarily in the context of the offerings of items to customers at or through an online marketplace, such as the customer 110 and the online marketplace 120 shown in FIG. 1. As will be recognized by those of skill in the art, however, the systems and methods disclosed herein may also be used in many other situations or with many other components.

Figure 2:
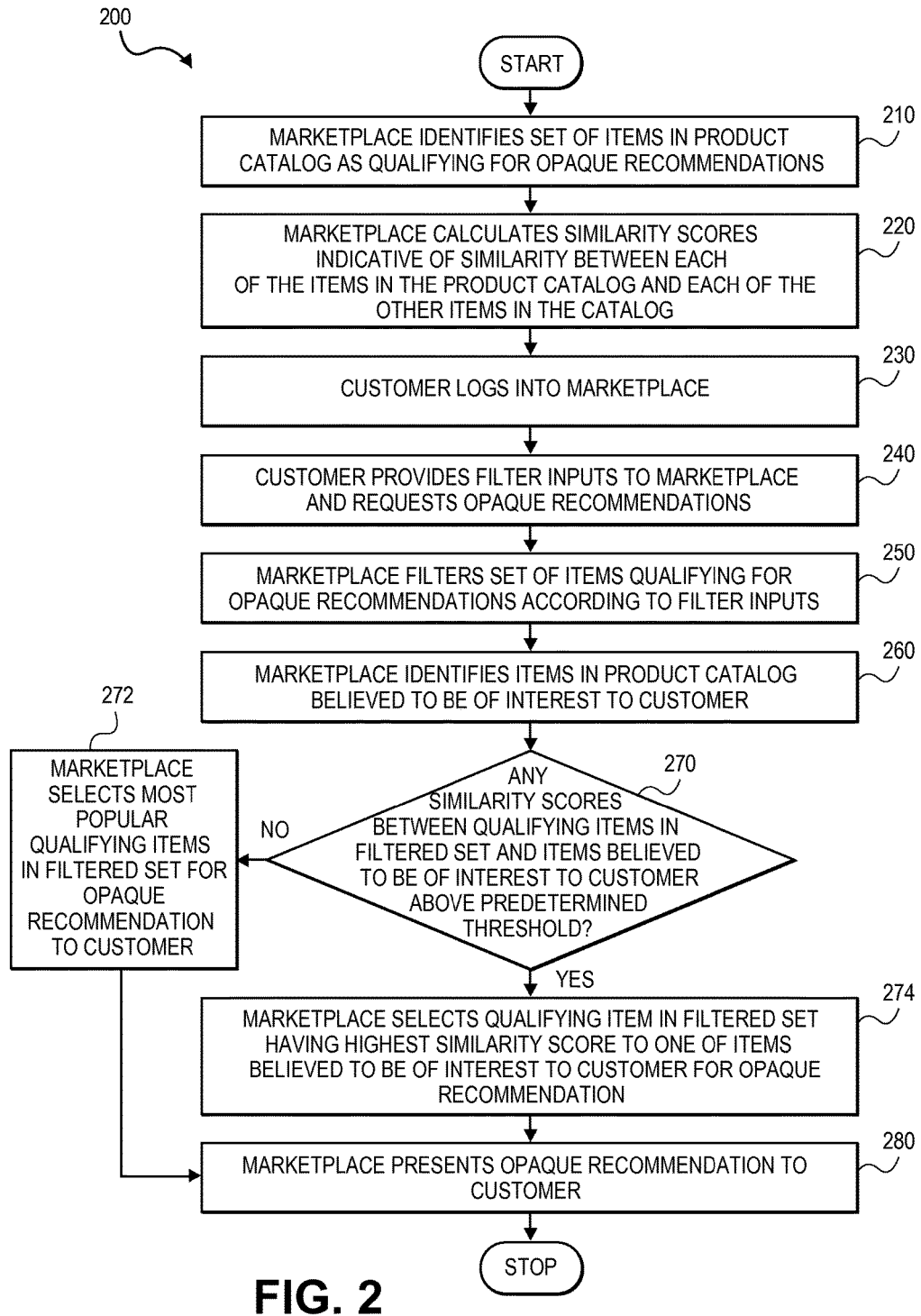
FIG. 2 is a flow chart of a process for providing opaque recommendations, in accordance with embodiments of the present disclosure.

Referring to FIG. 2, a flow chart 200 of one process for providing opaque recommendations is shown. At step 210, an online marketplace identifies a set of items in a product catalog as qualifying for opaque recommendations. For example, the online marketplace may identify one or more items that are nearing an expiration, such as fresh meats or produce, or one or more items of surplus supply. At step 220, the online marketplace calculates similarity scores indicative of the similarity between each of the items in the catalog and each of the other items in the catalog. Such similarity scores may represent a quantitative or qualitative determination of the relatedness between the respective attributes of each of the items in the product catalog.

At step 230, the customer logs into the online marketplace, such as by providing the online marketplace with a user name and/or password. At step 240, the customer requests an opaque recommendation from the online marketplace and provides the marketplace with one or more filter inputs (e.g., restrictions or limits on the types of items to be included in an opaque recommendation to the customer, or the offered prices of such items). For example, once the customer has been authenticated, the customer may request opaque recommendations of items and provide inputs using one or more user interfaces having selectable features (e.g., radio buttons, sliders, text boxes or fields, drop-down menus or like elements). The filters may designate the type or category of items for which the customer is interested in receiving an opaque recommendation (such as power tools or gourmet cheeses) as well as price range of items to be included in such recommendations.

At step 250, the marketplace filters the set of items that qualify for opaque recommendations according to the filter inputs. For example, the online marketplace may reduce the set of items to exclude all but the types or categories of items specified by the customer, as well as items falling outside a price range designated by the customer. At step 260, the marketplace identifies items in the product catalog that are believed to be of interest to the customer. Such items may be identified based on items that the customer previously viewed (e.g., evaluated for purchase) or purchased at the online marketplace, or items that may have been purchased by other customers who also viewed (e.g., evaluated for purchase) or purchased items that were viewed (e.g., evaluated for purchase) or purchased by the customer, or on any other basis.

At step 270, the marketplace determines whether any of the similarity scores associated with relationships between the items qualifying for opaque recommendations in the filtered set and items that are believed to be of interest to the customer exceed a predetermined threshold. For example, where an item that qualifies for an opaque recommendation must have a similarity score in excess of ninety percent (90%) with respect to an item in which a customer is believed to be interested in order to be recommended to that customer, the marketplace determines whether any of the items in the filtered set have corresponding similarity scores with respect to the items in which the customer is interested.

If none of the similarity scores exceeds the threshold, then the process advances to step 272, where the marketplace selects the most popular qualifying item in the filtered set for opaque recommendation to the customer. If any of the similarity scores exceeds the threshold, then the process advances to step 274, where the marketplace selects the qualifying item in the filtered set corresponding to the highest similarity score for opaque recommendation to the customer. At step 280, the marketplace presents the opaque recommendation that was identified at either step 272 or step 274 to the customer, such as in the form of an electronic message transmitted to the customer, or a user interface displayed to the customer on a computer display, and the process ends.

Accordingly, the systems and methods of the present disclosure may be used to identify one or more items that are eligible for opaque recommendations to customers, and to determine whether such items would be of interest to the customer, as determined at least in part by one or more filter inputs provided by the customer. If any such items are deemed to be sufficiently similar to those items that are believed to be of interest to the customer, then an opaque recommendation of the item may be provided to the customer.

As is discussed above, the systems and methods disclosed herein may identify an item as appropriate for an opaque recommendation to customers based on any factor or attribute of the item. One category of items that is particularly suitable for inclusion in an opaque recommendation is items having an inherent or imminent expiration date or time, or a date or time at which a value of the items are known to be reduced or eliminated. Where an expiration date of an item is known or may be determined, the item may be opaquely recommended to a customer in advance of the expiration date, such as in accordance with a designated lead time that may be intrinsic to the item or the expiration date, in order to increase the likelihood that the item will be sold through the opaque recommendation.

Referring to FIG. 3, one set 300 of data to be analyzed or displayed by systems and methods for providing opaque recommendations is shown. The set 300 of data relates to a plurality of items 320, 330, 340, 350 and is shown in a table having columns 311-317 corresponding to a name 311 of the item, a stock date 312 of the item, specifications 313 of the item, and an expiration date 314 of the item, notes 315 regarding the item, an opaque lead time 316 for the item, and a date 317 on which the item is eligible for opaque recommendation. The lead time 316 refers to a period of time in advance of the expiration date 314 of the item, and thus defines the eligibility date 317 for the item.

For example, as is shown in FIG. 3, the item 320 is a model of a smartphone that was stocked on Jun. 1, 2009, and a new model is expected to be released on Jun. 1, 2010. Therefore, because the demand for the item 320 will be substantially reduced upon the release of the new model (e.g., the expiration date, or Jun. 1, 2010), the item 320 may be deemed eligible for an opaque recommendation during the lead time 316 of sixty days, and recommended to customers at an opaque price that is less than the offered price for the item 320 in this timeframe, with the goal of selling one or more of the available items in advance of the release at the lower prices without adversely affecting the brand of the smartphone.

As is also shown in FIG. 3, the item 330 is a package of gourmet salmon filets, which may be maintained in a frozen state for one month before spoiling. Therefore, because the item 330 may not be sold after it has spoiled, the item 330 may be deemed eligible for an opaque recommendation during a lead time of five days, and recommended to customers at an opaque price that is less than the offered price for the item 330 during this timeframe, with the goal of selling all of the available salmon filets before they spoil.

The item 340 is a gallon of cleaning solution with a proprietary solvent that loses its effectiveness after a certain period of time. The item 350 includes four courtside seats to a championship game scheduled for Mar. 12, 2011. Therefore, because the value of the item 340 will decrease as the solution loses effectiveness, and because the item 350 will have no value after the championship game has been held, the item 340, 350 may be recommended to customers at opaque prices that are less than the offered prices for these items during the respective lead times shown in FIG. 3.

The opaque price of an item in an opaque offering may be selected on any basis. Referring to FIGS. 4A, 4B, 4C and 4D, plots 400A, 400B, 400C, 400D of price data over time are shown. The plots 400A, 400B, 400C, 400D display the offered prices 420, 430, 440, 450 and the opaque prices 428, 438, 448, 458 of the items 320, 330, 340, 350, respectively, represented in the set 300 of data of FIG. 3, over time.

Figure 4B:
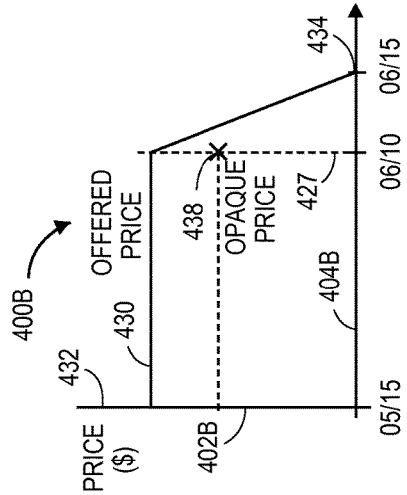
FIGS. 4A, 4B, 4C and 4D are plots of pricing information to be analyzed by systems and methods for providing opaque recommendations, in accordance with embodiments of the present disclosure.
Figure 4D:
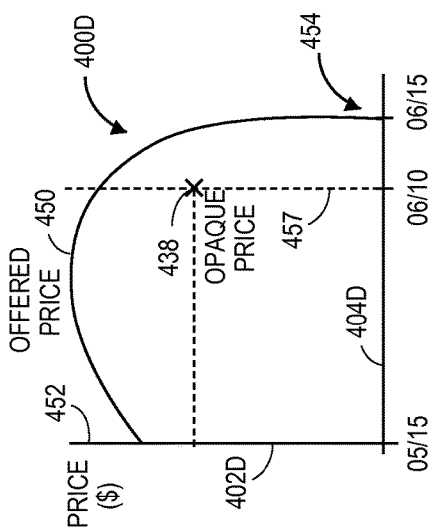
Figure 4A:
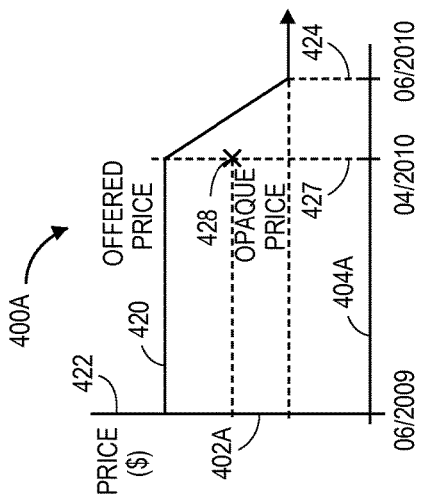

Referring to FIG. 4A, the plot 400A includes a price axis 402A and a date axis 404A, and shows the offered price 420 of the item 320 of FIG. 3 (viz., a smartphone) over time, as well as an opaque price 428 of the item 320 as of the opaque eligibility date 427. The offered price 420 of the item is shown at the stock date 422, at the opaque eligibility date 427 and at the expiration date 424. As is shown in FIG. 4A, the opaque price 428 of the item 320 is below the offered price 420 of the item 320 on the opaque eligibility date 427, but above the offered price 420 of the item 320 after the expiration date 424. By providing customers with opaque recommendations of the item 320 in advance of the expiration date 424, a marketplace may increase the likelihood that inventory of the item 320 will be sold to customers.

Similarly, referring to FIG. 4B, the plot 400B shows the offered price 430 of the item 330 of FIG. 3 (viz., the gourmet salmon filets) over time, as well as an opaque price 438 of the item 330 as of the opaque eligibility date 437. The offered price 430 of the item is shown as dynamically fluctuating between the stock date 432, the opaque eligibility date 437 and the expiration date 434. As is shown in FIG. 4B, the opaque price 438 of the item 330 is below the offered price 430 of the item 330 on the opaque eligibility date 437, but above the offered price 430 of the item 330 after the expiration date 434.

Figure 4C:
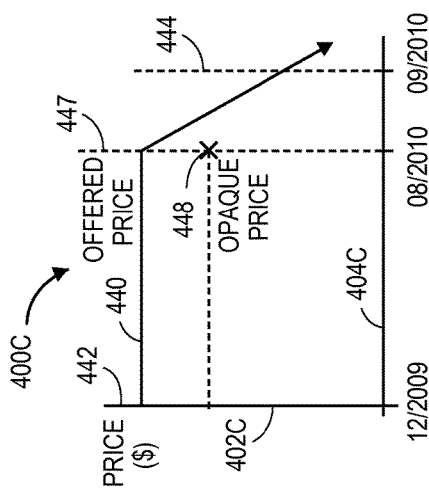

Referring to FIG. 4C, the plot 400C shows the offered price 440 of the item 340 of FIG. 3 (viz., the cleaning solution having the proprietary solvent) over time, as well as an opaque price 448 of the item 340 as of the opaque eligibility date 447. The offered price 440 of the item 340 is shown between the stock date 442, the opaque eligibility date 447 and the expiration date 444. As is shown in FIG. 4C, the opaque price 448 of the item 340 is below the offered price 440 of the item 340 on the opaque eligibility date 437, but above the offered price 440 of the item 340 after the expiration date 444.

Finally, referring to FIG. 4D, the plot 400D shows the offered price 450 of the item 350 of FIG. 3 (viz., the championship game tickets) over time, as well as an opaque price 458 of the item 340 as of the opaque eligibility date 457. The offered price 450 of the item 350 is shown between the stock date 452, the opaque eligibility date 457 and the expiration date 454. As is shown in FIG. 4D, the opaque price 458 of the item 350 is below the offered price 450 of the item on the opaque eligibility date 457, but above the offered price 450 of the item 350 after the expiration date 454.

Accordingly, as is discussed above, an item that is eligible for inclusion in an opaque offering may be offered to customers at an opaque price that is less than the offered price, in an effort to sell the item in advance of a looming expiration or devaluation thereof, without identifying the brand associated with the item. For example, opaque prices of items included may be determined as a function of a desired return on sales of the items, a desired rate at which the items are to be sold, a date of an upcoming expiration or devaluation of the items, a strength of a recommendation of the item to a customer, or an association of the item with the customer, or any other factor, as necessary.

Figure 5:
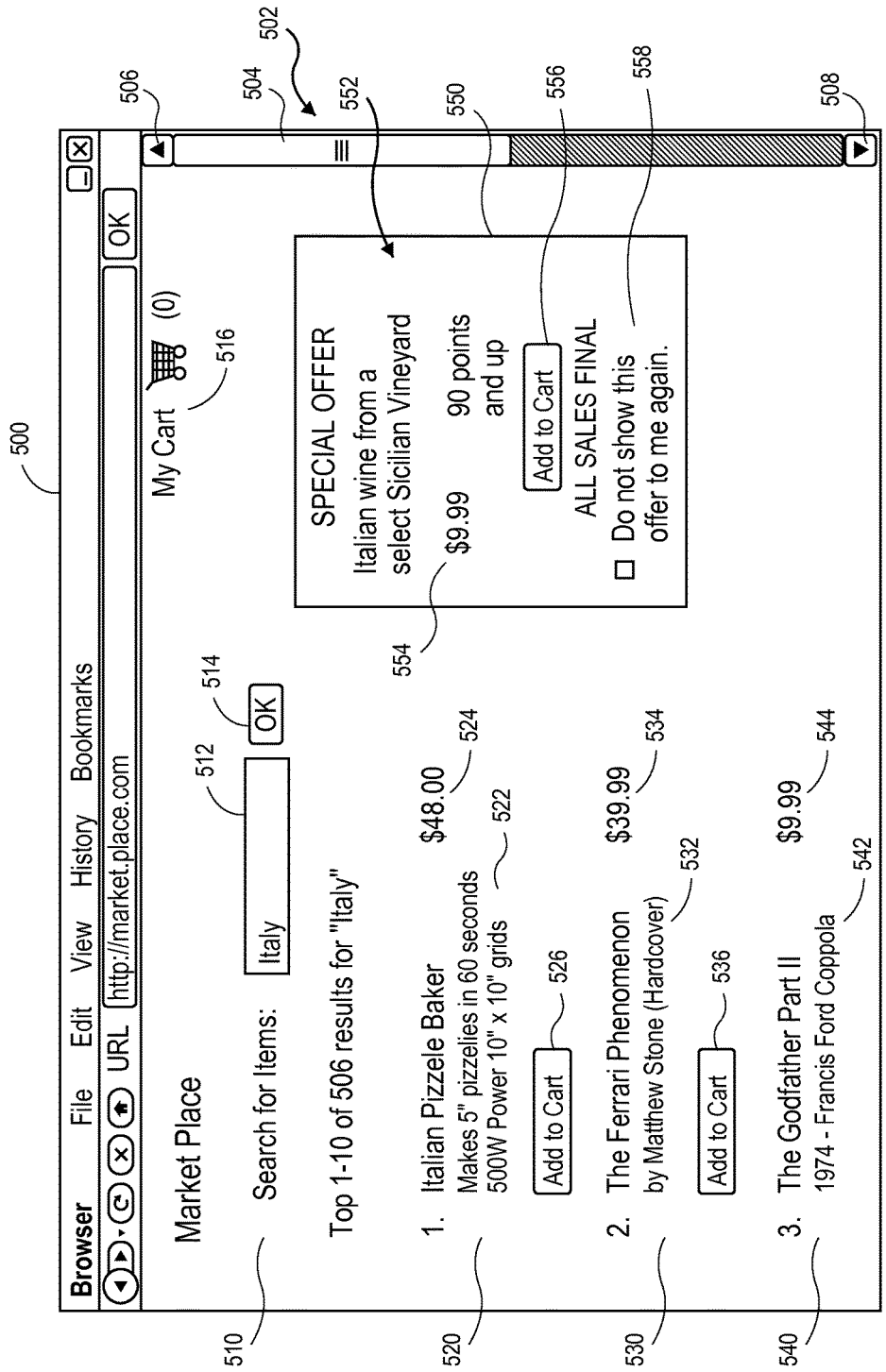
FIG. 5 is a user interface that may be displayed by systems and methods for providing opaque recommendations, in accordance with embodiments of the present disclosure.

As is discussed above, an opaque recommendation may be presented to a customer in any number of ways, such as in an electronic message or within a designated user interface. The opaque recommendation may be provided separately from any other recommendations or offerings, or along with one or more other opaque or transparent offerings. Referring to FIG. 5, a user interface 500 that may be displayed by systems and methods for providing opaque recommendations in accordance with embodiments of the present disclosure is shown. The user interface 500 displays a web site 510 corresponding to an online marketplace, and includes a slider 502 having a slider bar 504 and arrows 506, 508 for translating content of the web site 510 within the user interface 500. The web site 510 includes a search box 512, a button 514 for initiating a search based on the contents of the search box 512, and an identifier 516 of a status of a virtual "shopping cart."

As is shown in FIG. 5, the web site 510 includes a plurality of transparent offerings 520, 530, 540 and an opaque offering 550 corresponding to a term within the search box 512 (viz., Italy). The transparent offerings 520, 530, 540 include a plurality of specific details 522, 532, 542 regarding the items, prices 524, 534, 544 for the items, and selectable buttons 526, 536, 546 for adding the items to the virtual shopping cart.

The opaque offering 550 appears in an inset on the web site 510, and includes vague, non-specific details 552 regarding the item, as well as a price 554 of the item and a selectable button 556 for adding the item to the virtual shopping cart. The opaque offering 550 also permits a user to opt out of receiving opaque recommendations by selecting the check box 558.

Figure 6:
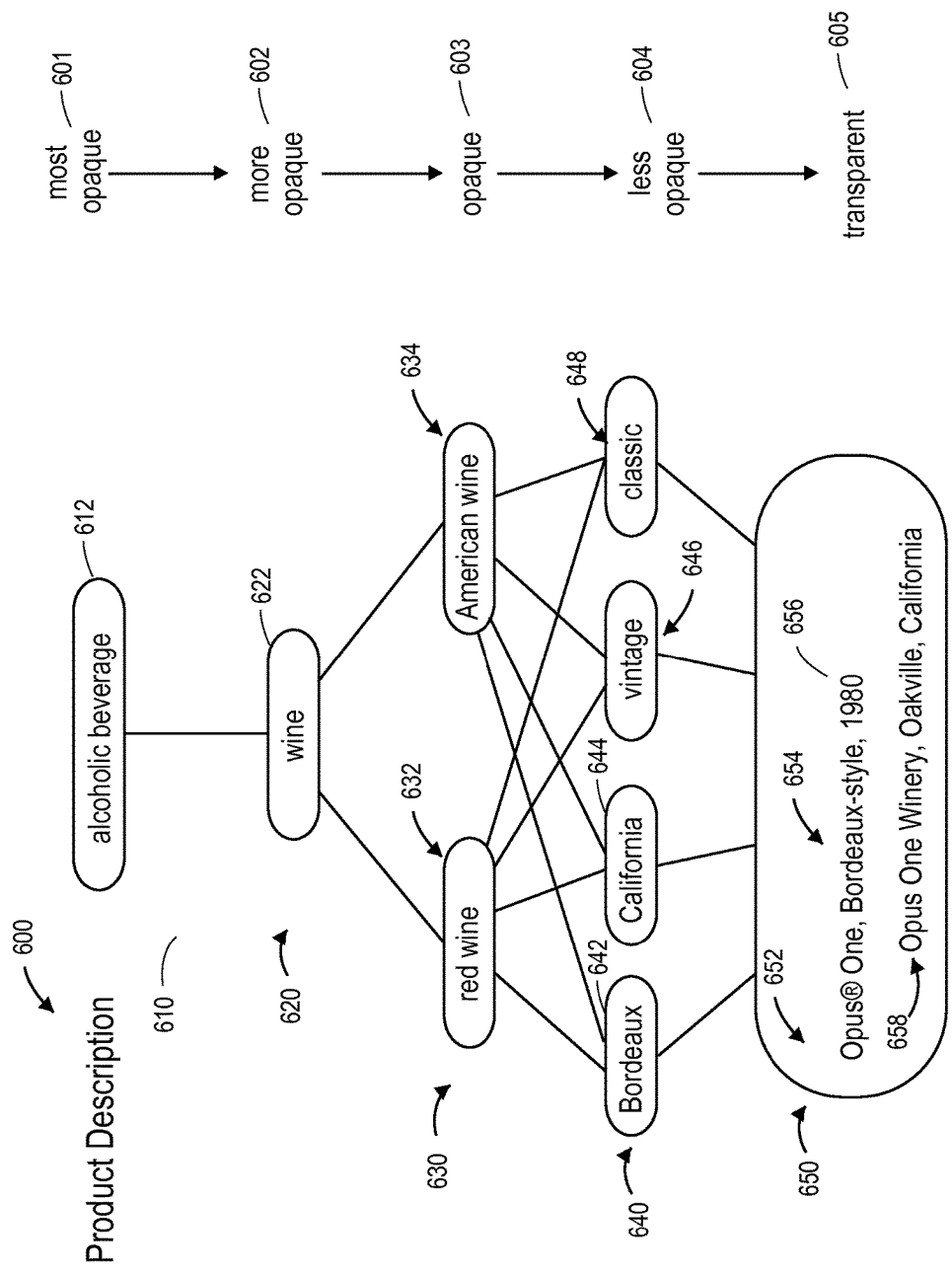
FIG. 6 is a set of product information to be analyzed or displayed by systems and methods for providing opaque recommendations, in accordance with embodiments of the present disclosure.

As is discussed above, unlike a transparent offering, an opaque offering of an item withholds at least one element of information regarding the item (e.g., a brand associated with the item) from the customer. Such opaque offerings or recommendations may therefore describe the item in any number of ways or manners, ranging from opaque, semi-opaque to transparent, depending on the number of elements of information that are withheld from the customer, and the opaque price at which such items are offered may reflect the amount of information provided to the customer. Referring to FIG. 6, a set of information regarding a product 600 to be analyzed or displayed by systems and methods for providing opaque recommendations in accordance with embodiments of the present disclosure is shown. The set 600 of product information is presented in a plurality of levels 610, 620, 630, 640, 650, ranging in opacity from most opaque 601 to transparent 605.

For example, a transparent offering may include details regarding the product 600 described in FIG. 6 at the level 650 of maximum transparency 605, i.e., as a bottle of Opus® One Bordeaux-style red wine, from the Opus One Winery in Oakville, Calif., and a vintage year of 1980. At the highest level 610 of opacity (i.e., fully opaque), the product 600 may be described in a most opaque 601 manner as merely an alcoholic beverage 612. At another level 620 of opacity, the product 600 may be described in a more opaque 602 manner as a wine 622. At a third level 630 of opacity, the product 600 may be described in an opaque 603 manner as a red wine 632, or as an American wine 634. At yet another level 640 of opacity, the product 604 may be described as a Bordeaux 642 wine, a California 644 wine, a vintage 646 wine or a classic 648 wine.

Thus, opaque recommendations of items may be provided with any level of opacity regarding one or more details regarding the item. As is discussed above, the price of an item provided in an opaque recommendation is typically a function of the amount or extent of information disclosed therein (i.e., the uncertainty associated with the recommended item), such that where the opaque recommendation includes more information, an opaque price of the item approaches the offered price, and when the opaque recommendation includes less information, the opaque price of the item deviates from the offered price, thereby increasing the likelihood that the item will sell.

Figure 7:
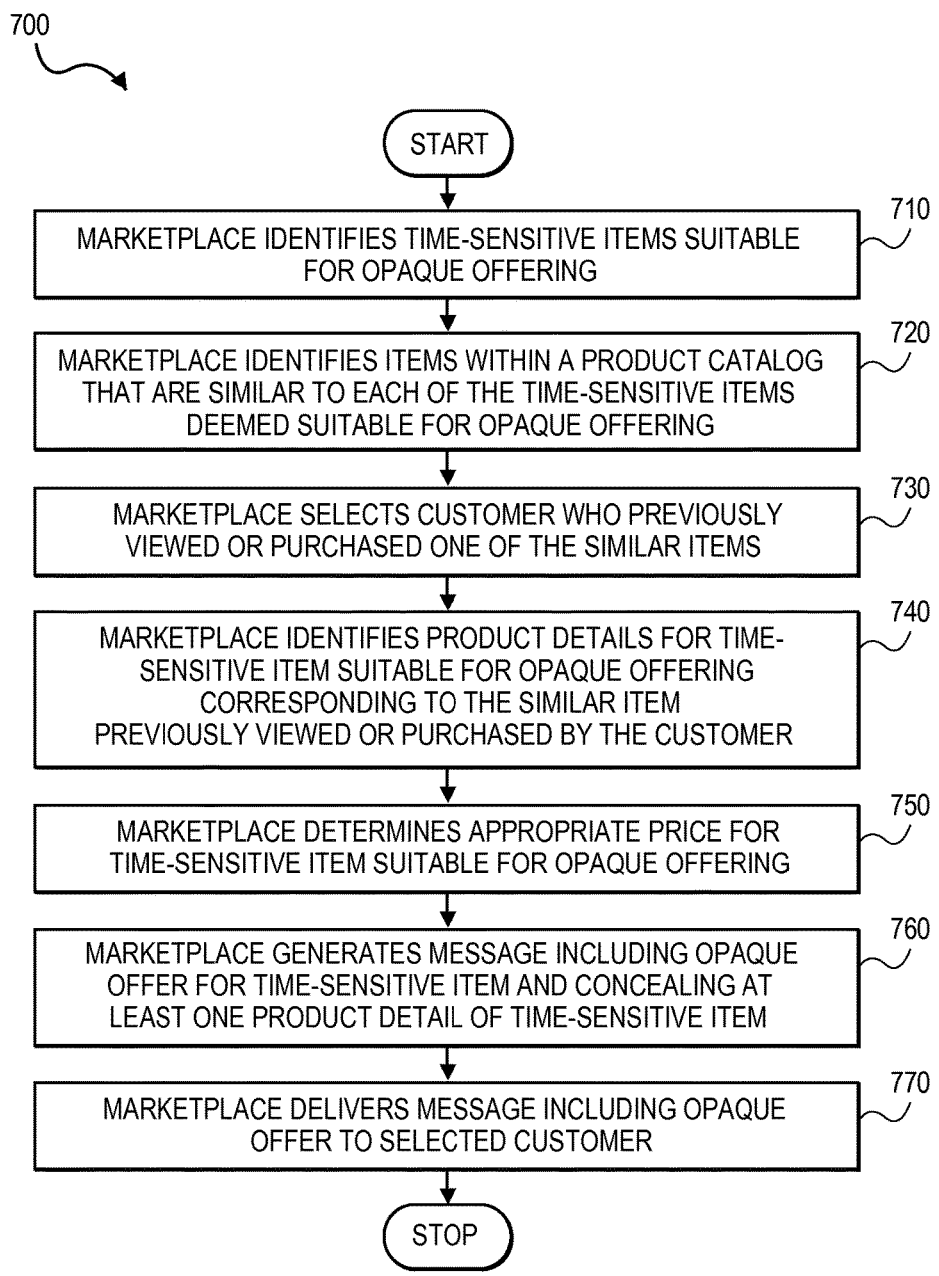
FIG. 7 is a flow chart of a process for providing opaque recommendations, in accordance with embodiments of the present disclosure.

As is discussed above, opaque recommendations may be personalized for or tailored to specific customers based on their respective interests. Referring to FIG. 7, a flow chart 700 of a process for providing opaque recommendations in accordance with embodiments of the present disclosure is shown. At step 710, a marketplace identifies time-sensitive items within a product catalog that are suitable for inclusion in opaque offerings. Such items may have a looming expiration or devaluation date (e.g., fresh food or a ticket to a specific event), or any other factor that would provide an incentive to sell the products quickly.

At step 720, the marketplace may identify items within the product catalog that are similar to each of the time-sensitive items that were deemed suitable for inclusion in opaque offerings at step 710. For example, where a set of gourmet steaks from an obscure Argentinian farm is identified as eligible for inclusion in a opaque offering, the marketplace may identify any steak sauces, steak rubs or grilling utensils that are offered in the product catalog and determine their respective similarities to the gourmet steaks, using any qualitative or quantitative formulas or algorithms. The similar items may be identified by any means, including but not limited to any other algorithms, formulas or equations for determining similarities or associations between items that are eligible for inclusion in an opaque recommendation and one or more of the items in a product catalog. For example, pairwise similarity scores may be calculated between and among the items in a product catalog, either in real time or in near-real time, or offline, and the items in the product catalog having the highest similarity scores with respect to one or more of the time-sensitive items may be identified.

At step 730, the marketplace selects a customer who previously viewed or purchased one or more of the items that were deemed similar to the opaque-eligible time-sensitive items. For example, where the set of Argentinian steaks described above has been designated for inclusion in an opaque offering, the marketplace may identify one or more customers who previously purchased the steak sauces, steak rubs or grilling utensils from the product catalog that were identified at step 720.

At step 740, the marketplace identifies the product details for the time-sensitive items. For example, the relevant product details regarding the set of Argentinian steaks described above may include the name or location of the farm from which the steaks originated, the type of feed provided to the cattle (e.g., grass-fed or corn-fed), as well as the thickness, cut or marbling levels of the steaks, and their standard offered prices. At step 750, the marketplace determines an appropriate price for an opaque recommendation of the time-sensitive items. The opaque price may reflect an amount of information to be provided in an opaque recommendation of the time-sensitive item, and may be based on a price of the item in a transparent offering, as well as any lead time preceding a date on which the steaks may expire or spoil.

At step 760, the marketplace generates a message including an opaque offer for the time-sensitive item that conceals at least one detail of the time-sensitive item. The opaque offer may withhold the brand name (e.g., the name of the specific Argentinian farm), as well as the cut type or any other relevant factor regarding the time-sensitive item that may result in an opaque offering of the item. At step 770, the marketplace delivers the message including the opaque offering to the selected customer, such as in the form of an electronic mail (or E-mail) message, a short or multimedia messaging service (SMS or MMS) text message, or a social network message or posting, and the process ends.

Accordingly, the systems and methods of the present disclosure may be utilized to provide opaque recommendations of items at prices that are a function of the regularly offered price and the amount of information or details included therein, and to identify customers who may receive such recommendations based on any discernable similarity between such items and items in which the customer may be interested. When an opaque recommendation is provided, an item may be offered to customers at reduced prices, without any threat to a brand associated with the item.

Figure 8A:
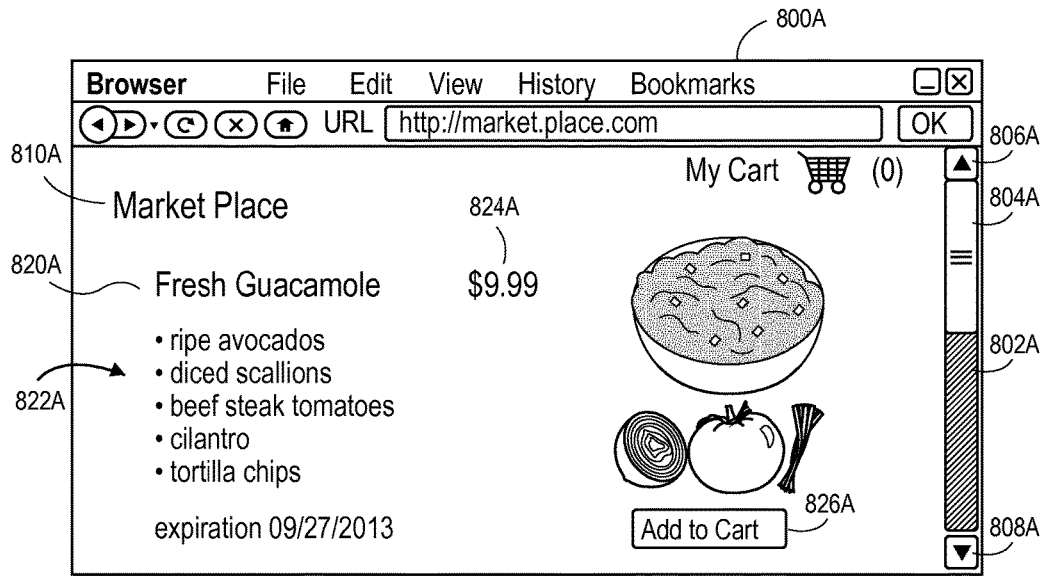
FIGS. 8A and 8B are a user interface and an electronic message that may be provided by systems and methods for providing opaque recommendations, in accordance with embodiments of the present disclosure.
Figure 8B:
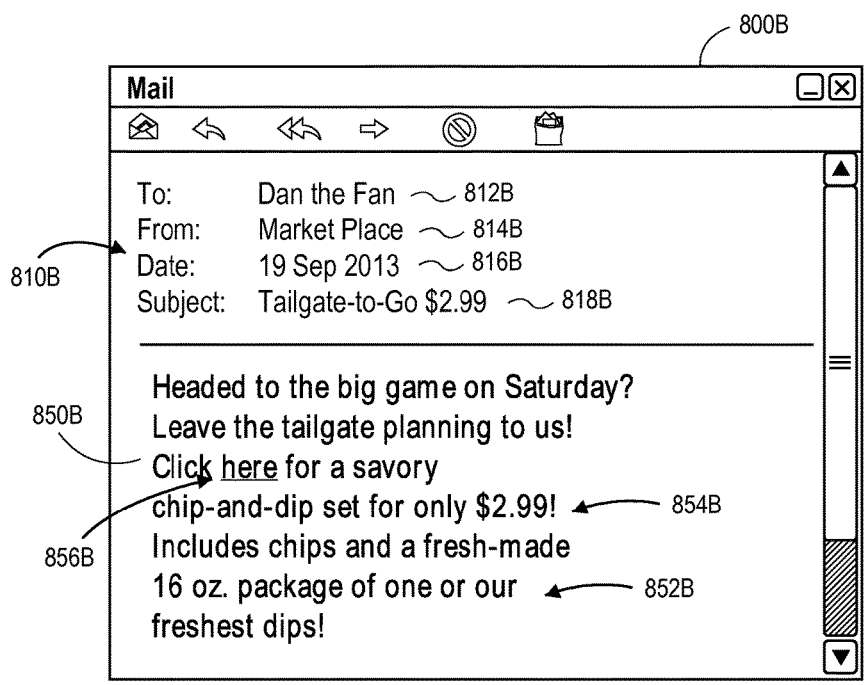

As is discussed above, the contents of an opaque offering or recommendation of an item (e.g., the details or terms provided therein) may be determined based on a set of information regarding the item that are available for use in transparent offerings of the item. The information may be identified for use in the opaque offering by any means, such as by analyzing the contents of a product details page at which a transparent offering of the item is hosted, and extracting one or more sentiments therefrom for use in an opaque offering, or by promoting the item in one or more contexts. The opaque offering must conceal at least one detail regarding the item (e.g., the brand of the item) and typically offer the item at an opaque price that is less than the standard offered price for the item. Referring to FIGS. 8A and 8B, a user interface 800A and an electronic message 800B that may be generated or provided by systems and methods for providing opaque recommendations in accordance with embodiments of the present disclosure are shown.

The user interface 800A of FIG. 8A displays a web page 810A including a transparent offering 820A of an item (viz., fresh guacamole). The transparent offering 820A includes details regarding the item (viz., the ingredients of the guacamole) and an offered price 824A of the item. The transparent offering 820A of the item further includes a selectable buttons 826A for adding the item to a virtual shopping cart.

The electronic message 800B of FIG. 8B includes a message header 810B and an opaque offering 850B of the same item that was included in the transparent offering 820A of FIG. 8A. The message header 810B identifies a sender 812B and a recipient 814B of the electronic message 800B, a date 816B on which the message 800B was sent, and a subject 818B of the message 800B. The opaque offering 850B of FIG. 5B includes details 822B regarding the item (e.g., chips and a dip), an opaque price 854B of the item and a selectable link 856B to a web site from which the item may be purchased.

As is shown in FIGS. 8A and 8B, the opaque offering 850B of the item shown in FIG. 8B includes details 852B that are noticeably less comprehensive (or more vague) than the details 812B of the transparent offering 820A of the same item, as is shown in FIG. 8A. For example, while the details 852B of the opaque offering 850B only generically reference a dip and chips, the details 822A of the transparent offering 820A identify the type of dip (viz. guacamole) and several of the ingredients included therein. Additionally, the price 854B of the opaque offering 850B (viz., $2.99) is significantly less than the price 824A of the transparent offering 820A (viz., $9.99). Furthermore, the opaque offering 850B is presented in the context of a discounted product for use at a tailgate party for an upcoming game (e.g., subject 818B of "Tailgate-to-Go $2.99" and details 852B "Headed to the big game on Saturday?"), and is targeted to a recipient 812B who may be believed to be interested in such an item (e.g., "Dan the Fan"). Moreover, the date 816B on which the electronic message 800B was transmitted to the recipient 812B is within a lead time of an expiration date of the transparent offering 820A (e.g., Sep. 27, 2013, versus Sep. 19, 2013).

Thus, the systems and methods of the present disclosure may be adapted to generate opaque offerings or recommendations of items based on any available information or data regarding the items, including details set forth in one or more transparent offerings of such items, such as a product details page. The opaque offerings or recommendations may be based on information extracted from such transparent offerings, and modified or diluted to conceal at least one detail of the items, such as a brand associated with the items.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although many of the embodiments disclosed herein refer to the sale of expiring food products, the systems and methods disclosed herein are not so limited. Those of ordinary skill in the art would recognize that any item may be made the subject of an opaque offering in accordance with the present disclosure, and provided to an appropriate customer in the form of an opaque recommendation.

It should be understood that, unless otherwise explicitly or implicitly indicated herein, any of the features, characteristics, alternatives or modifications described regarding a particular embodiment herein may also be applied, used, or incorporated with any other embodiment described herein. Moreover, with respect to the one or more methods or processes of the present disclosure described herein, including but not limited to the flow charts shown in FIG. 2 or 7, the order in which the methods or processes are listed is not intended to be construed as a limitation on the claimed inventions, and any number of the method or process steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method comprising:
   determining, by a marketplace computer system having at least one computer processor and at least one data store, that a product is eligible for presentation in an opaque manner;
   identifying, by the marketplace computer system, a first set of instructions for displaying a transparent offering of the eligible product on a client device, wherein the first set of instructions is stored in the at least one data store, wherein the transparent offering of the eligible product comprises a set of attributes of the eligible product, wherein the set of attributes is stored in a dataset in the at least one data store, and wherein the set of attributes comprises a brand associated with the eligible product and an offered price for the eligible product in a transparent offering;

identifying a first customer as interested in the eligible product by the marketplace computer system;

establishing a level of opacity for a recommendation of the eligible product by the marketplace computer system;

responsive to the level of opacity corresponding to the transparent offering of the eligible product, transmitting, over a network, the first set of instructions from the marketplace computer system to a client device associated with the first customer; and responsive to the level of opacity corresponding to an opaque offering of the eligible product:

extracting, from the transparent offering, one or more sentiments associated with the set of attributes of the eligible product;

selecting at least one of the set of attributes of the eligible product based at least in part on the level of opacity and the one or more sentiments by the marketplace computer system, wherein the selected at least one of the attributes does not include the brand associated with the eligible product or the offered price for the eligible product in the transparent offering;

modifying the first set of instructions based at least in part on the level of opacity and the one or more sentiments for displaying the opaque offering to conceal the brand associated with the eligible product and the offered price for the eligible product, and to include the selected at least one of the attributes of the eligible product, wherein the opaque offering includes the selected at least one of the attributes included in the set of attributes stored in the dataset, and wherein the opaque offering does not include the brand or the offered price included in the set of attributes stored in the dataset;

generating a second set of instructions for displaying the opaque offering of the eligible product on a client device by the marketplace computer system, wherein the second set of instructions comprises the modified first set of instructions; and transmitting, over the network, the second set of instructions from the marketplace computer system to the client device associated with the first customer.

2. The computer-implemented method of claim 1, further comprising:

responsive to the level of opacity corresponding to the opaque offering of the eligible product:

causing a display of a network page comprising at least the selected at least one of the attributes of the eligible product on a computer display of the client device associated with the first customer based at least in part on the second set of instructions.

3. The computer-implemented method of claim 1, further comprising:

responsive to the level of opacity corresponding to the opaque offering of the eligible product:

determining an opaque price for the eligible product by the marketplace computer system based at least in part on the level of opacity, wherein the opaque price is less than the offered price of the eligible product in the transparent offering, wherein the opaque offering comprises the opaque price.

4. The computer-implemented method of claim 1, wherein determining that the product is eligible for presentation in the opaque manner comprises:

determining a date of expiration of the eligible product by the marketplace computer system;

identifying a lead time associated with the expiration of the eligible product by the marketplace computer system; and determining that the product is eligible for presentation in the opaque manner within the lead time in advance of the date of the expiration of the eligible product by the marketplace computer system, and wherein establishing the level of opacity for the offering of the eligible product comprises:

determining the level of opacity based on at least one of the date of expiration or the lead time by the marketplace computer system.

5. The computer-implemented method of claim 1, wherein determining that the product is eligible for presentation in the opaque manner comprises:

determining an inventory level of the eligible product by the marketplace computer system;

identifying an inventory threshold for the eligible product by the marketplace computer system; and determining that the inventory level of the eligible product exceeds the inventory threshold for the eligible product by the marketplace computer system;

in response to determining that the inventory level of the eligible product exceeds the inventory threshold for the eligible product, determining that the product is eligible for presentation in the opaque manner by the marketplace computer system, and wherein establishing the level of opacity for the offering of the eligible product comprises:

determining the level of opacity based at least in part on at least one of the inventory level of the eligible product or the inventory threshold for the eligible product by the marketplace computer system.

6. The computer-implemented method of claim 1, wherein identifying the first customer as interested in the eligible product comprises:

identifying a plurality of products in a product catalog that are similar to the eligible product by the marketplace computer system; and identifying a plurality of products in which the first customer is believed to be interested by the marketplace computer system, wherein the first customer is identified as interested in the eligible product if one of the products identified as similar to the eligible product is one of the products in which the first customer is believed to be interested.

7. The computer-implemented method of claim 6, wherein identifying the plurality of products that are similar to the eligible product comprises:

calculating a similarity score for each of the products in the product catalog with respect to each of the other products in the product catalog by the marketplace computer system, wherein the first customer is identified as interested in the eligible product if the similarity score for the eligible product with respect to one of the products in which the first customer is believed to be interested exceeds a similarity threshold.

8. The computer-implemented method of claim 6, wherein identifying the plurality of products in which the first customer is believed to be interested comprises:
  identifying a product of interest to both the first customer and a second customer by the marketplace computer system;
  identifying a plurality of products in which the second customer is believed to be interested by the marketplace computer system; and
  associating the plurality of products in which the second customer is believed to be interested with the first customer by the marketplace computer system,
  wherein the plurality of products in which the first customer is believed to be interested includes at least one of the plurality of products in which the second customer is believed to be interested.

9. The computer-implemented method of claim 8, wherein the product of interest to the first customer and the second customer is one of:
  a product previously purchased by both the first customer and the second customer, or
  a product previously evaluated for purchase by both the first customer and the second customer.

10. The computer-implemented method of claim 1, wherein identifying the first customer as interested in the eligible product comprises:
  identifying at least one attribute of a product of interest to the first customer by the marketplace computer system; and
  determining that the first customer is interested in the eligible product if the at least one attribute of the product of interest to the first customer is similar to at least one of the set of attributes of the eligible product,
  wherein establishing the level of opacity for the offering of the eligible product comprises:
  determining the level of opacity based at least in part on the at least one attribute of the product of interest to the first customer.

11. The computer-implemented method of claim 10, wherein the product of interest to the first customer is one of:
  a product previously purchased by the first customer, or
  a product previously evaluated for purchase by the first customer.

12. The computer-implemented method of claim 1, further comprising:
  receiving, over the network by the marketplace computer system, information regarding the eligible product from a source of the eligible product,
  wherein establishing the level of opacity for the offering of the eligible product comprises:
  determining the level of opacity based at least in part on the information regarding the eligible product received from the source of the eligible product by the marketplace computer system.

13. The computer-implemented method of claim 1, further comprising:
  determining an opaque price for the eligible product based at least in part on the selected at least one of the attributes by the marketplace computer system,
  wherein the opaque offering comprises the opaque price.

14. The computer-implemented method of claim 1, further comprising:
  identifying an expiration date for the eligible product by the marketplace computer system; and
  defining an opaque price for the eligible product as a function of time until the expiration date, by the marketplace computer system,
  wherein the first customer is identified as interested in the eligible product at a first time, and
  wherein the opaque offering to the first customer comprises the opaque price as of the first time.

15. The computer-implemented method of claim 1, wherein transmitting the second set of instructions from the marketplace computer system to the client device associated with the first customer comprises:
  transmitting an electronic message to an account associated with the first customer over the network,
  wherein the electronic message comprises at least one of the second set of instructions or an element linked to the second set of instructions.

16. The computer-implemented method of claim 1, further comprising:
  receiving at least one filter input from the client device associated with the first customer over the network,
  wherein determining that the product is eligible for presentation in the opaque manner comprises:
  searching a product catalog for items in accordance with the filter input by the marketplace computer system, wherein the product catalog is maintained in the at least one data store; and
  identifying, by the marketplace computer system, one of the items in the product catalog based at least in part on the filter input,
  wherein the eligible product is the one of the items identified in the product catalog.

17. The computer-implemented method of claim 1, wherein identifying the first customer as interested in the eligible product comprises:
  receiving, by the marketplace computer system, a request for a recommendation of a product from the client device associated with the first customer over the network.

18. The computer-implemented method of claim 1, wherein identifying the first customer as interested in the eligible product comprises:
  receiving, by the marketplace computer system, a keyword from the client device associated with the first customer over network; and
  searching a product catalog for products relating to the keyword by the marketplace computer system,
  wherein the eligible product is related to the keyword.

* * * * *